US010556673B2

(12) United States Patent
Gurvich et al.

(10) Patent No.: US 10,556,673 B2
(45) Date of Patent: Feb. 11, 2020

(54) MANUFACTURING METHOD OF POLYMER COMPOSITE/METAL LOAD TRANSFER JOINT FOR LANDING GEAR

(71) Applicant: Goodrich Corporation, Charlotte, NC (US)

(72) Inventors: Mark R. Gurvich, Middletown, CT (US); Georgios S. Zafiris, Glastonbury, CT (US); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 787 days.

(21) Appl. No.: 15/193,968

(22) Filed: Jun. 27, 2016

(65) Prior Publication Data

US 2017/0369158 A1    Dec. 28, 2017

(51) Int. Cl.
  *B64C 25/34* (2006.01)
  *B64C 25/02* (2006.01)
  *F16C 7/02* (2006.01)

(52) U.S. Cl.
  CPC .............. *B64C 25/34* (2013.01); *B64C 25/02* (2013.01); *F16C 7/026* (2013.01)

(58) Field of Classification Search
  CPC ......... B64C 25/00; B64C 25/02; B64C 25/34; F16C 3/023; F16C 7/02; F16C 7/026; F16C 2323/43; Y10T 403/39; Y10T 403/3906; Y10T 403/3933; Y10T 403/3946; Y10T 403/3993
  USPC .......................... 403/187, 188, 192, 194, 201
  See application file for complete search history.

(56) References Cited

U.S. PATENT DOCUMENTS

| 3,725,981 | A | * | 4/1973 | Pinckney | ................ F16C 3/026 24/122.3 |
| 4,275,122 | A | * | 6/1981 | Fisher | ..................... F16C 3/026 285/423 |
| 4,491,342 | A |  | 1/1985 | Aubry | |
| 4,704,918 | A | * | 11/1987 | Orkin | ...................... F16C 7/026 403/224 |
| 4,719,315 | A | * | 1/1988 | Gregorac | ................ H01R 9/05 174/73.1 |
| 4,722,717 | A | * | 2/1988 | Salzman | ................. F16C 3/026 403/265 |
| 5,082,314 | A |  | 1/1992 | Aubry | |
| 8,414,724 | B2 | * | 4/2013 | Schnelz | ................. F16C 7/026 156/172 |
| 9,499,257 | B2 | * | 11/2016 | Baird | ...................... B64C 25/02 |

(Continued)

OTHER PUBLICATIONS

European Patent Office, European Search Report dated May 4, 2018 in Application No. 17178188.3-1010 / 3263448.

*Primary Examiner* — Josh Skroupa
(74) *Attorney, Agent, or Firm* — Snell & Wilmer, L.L.P.

(57) ABSTRACT

A landing gear arrangement may comprise a first composite layer, the first composite layer having a cylindrical geometry, a metallic ring comprising an inner surface and an outer surface, the metallic ring perimetrically surrounding at least a portion of the first composite layer, the inner surface being in contact with the first composite layer, a metallic connecting tab extending away from the outer surface, and a second composite layer at least partially perimetrically surrounding the metallic ring and at least partially perimetrically surrounding the first composite layer, the outer surface being in contact with the second composite layer.

20 Claims, 6 Drawing Sheets

(56) References Cited

U.S. PATENT DOCUMENTS

2013/0062012 A1* 3/2013 Masson .................. F16C 7/026
　　　　　　　　　　　　　　　　　　　　　　156/305
2017/0283623 A1* 10/2017 McCabe ................. F16C 3/023

* cited by examiner

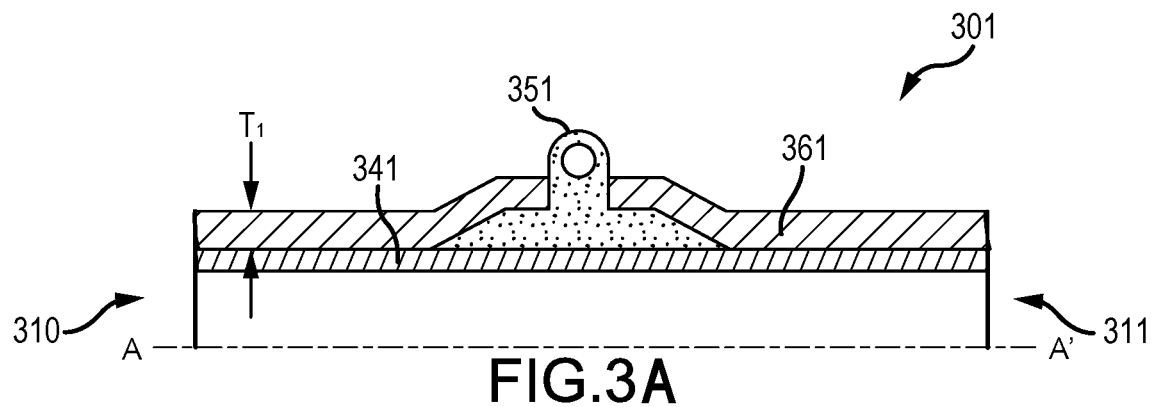
FIG.3A
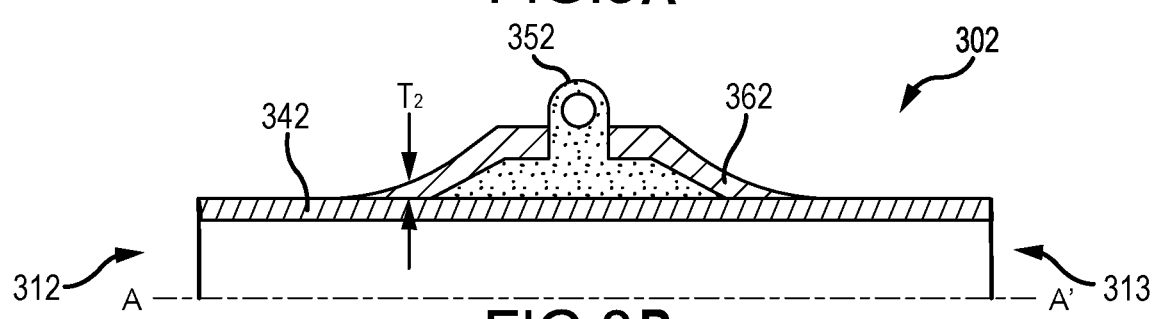
FIG.3B
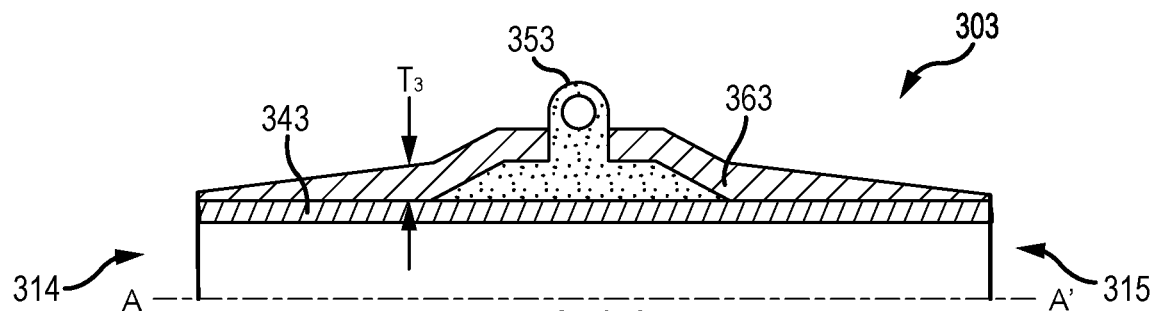
FIG.3C
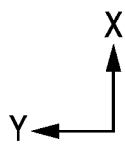

MANUFACTURING METHOD OF POLYMER COMPOSITE/METAL LOAD TRANSFER JOINT FOR LANDING GEAR

FIELD

The present disclosure relates to systems and methods for composite devices, and, more specifically, to systems and methods for transferring loads to and/or from composite members.

BACKGROUND

Landing gear assemblies typically comprise a shock strut assembly coupled to a wheel truck having one or more wheels. The shock strut assembly is also coupled to other components of the landing gear, including a pintle frame, one or more torque links, and one or more drag braces. Each of these components (as well as others) may be secured to the shock strut assembly by a joint. Localized loads may be transferred at such joints.

Traditional landing gear assemblies typically comprise metal components. Landing gear components and cylinders constructed of polymer-matrix fiber-reinforced composite materials offer the potential benefit of weight reduction over metal constructions. Although a polymer composite member can be designed to accommodate loads applied to the ends of the polymer composite member, accommodation of localized loads within the member can be particularly challenging.

SUMMARY

The present disclosure is related to systems and methods for transferring loads. A landing gear arrangement may comprise a first composite layer, the first composite layer having a cylindrical geometry, a metallic ring comprising an inner surface and an outer surface, the metallic ring perimetrically surrounding at least a portion of the first composite layer, the inner surface being in contact with the first composite layer, a metallic connecting tab extending away from the outer surface, and a second composite layer at least partially perimetrically surrounding the metallic ring and the first composite layer, the outer surface being in contact with the second composite layer.

In various embodiments, the outer surface may comprise a constant diameter portion, a first varying diameter portion, and a second varying diameter portion, the first varying diameter portion and the second varying diameter portion being located at axially opposite ends of the constant diameter portion, the metallic connecting tab extending from the constant diameter portion. A minimum diameter of the first varying diameter portion may be located at a first terminus of the metallic ring and a maximum diameter of the first varying diameter portion may be located at a junction of the constant diameter portion and the first varying diameter portion. The first varying diameter portion may comprise a monotonically decreasing diameter from the junction of the constant diameter portion and the first varying diameter portion to the first terminus. The second composite layer may comprise a uniform thickness. The second composite layer may comprise a monotonically decreasing thickness, the monotonically decreasing thickness decreasing axially along the second composite layer. The second composite layer may extend axially from a location between the metallic ring and a first terminus of the second composite layer to a location between the metallic ring and a second terminus of the second composite layer.

A landing gear arrangement may comprise a first composite layer having an outer surface, a metallic load transfer member comprising an inner surface having a constant diameter, the metallic load transfer member perimetrically surrounding at least a portion of the first composite layer, wherein the constant diameter and a diameter of the outer surface are substantially equal, and a second composite layer perimetrically surrounding at least a portion of the metallic load transfer member.

In various embodiments, the second composite layer may comprise an outer layer of the landing gear arrangement. The first composite layer may be impregnated with a resin. The second composite layer may be impregnated with a resin. The landing gear arrangement may be cured to form a single unitary member. The metallic load transfer member may comprise a metallic connecting tab extending away from the metallic load transfer member in a radial direction, an axial direction, a tangential direction, or any combination thereof, and may extend through the second composite layer. At least a portion of the metallic connecting tab may be located further radially outward than the second composite layer. The landing gear arrangement may further comprise a metallic liner, the metallic liner comprising a cylinder. The metallic liner may be located radially inward from the first composite layer, the first composite layer being wrapped around the metallic liner. A diameter of an inner surface of the first composite layer and a diameter of an outer surface of the metallic liner may be substantially equal.

A method for connecting a metallic member to a composite cylinder may comprise placing a first composite layer over a cylindrical member, placing a metallic load transfer member over the first composite layer, placing a second composite layer over at least a portion of the first composite layer and over at least a portion of the metallic load transfer member to form a composite/metallic arrangement, and applying at least one of heat or pressure to the composite/metallic arrangement.

In various embodiments, the method may further comprise removing the cylindrical member from the composite/metallic arrangement. The application of the heat and/or pressure may be performed after the placement of the first composite layer and before the placement of the metallic load transfer member. The placement of the second composite layer may comprise placing the second composite layer such that the second composite layer is non-uniform in thickness. The placement of the second composite layer may comprise placing the second composite layer such that a portion of the metallic load transfer member is located further radially outward than the second composite layer.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A, FIG. 3B, and FIG. 3C illustrate partial axial cross-section views of a second composite layer of a landing gear arrangement, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "inner" refers to the radially inward direction. As used herein, "outer" refers to the radially outward direction.

Landing gear components and cylinders constructed of polymer-matrix composite materials offer the potential benefit of significant weight reduction over metal constructions. Although polymer composite members can be designed to accommodate loads applied to their ends, accommodation of localized loads within the members can be particularly challenging. The composite/metallic arrangement discussed herein provides a robust composite joint design and manufacturing method that allows for transfer and distribution of localized loads to a composite landing gear structure.

Figure 1:
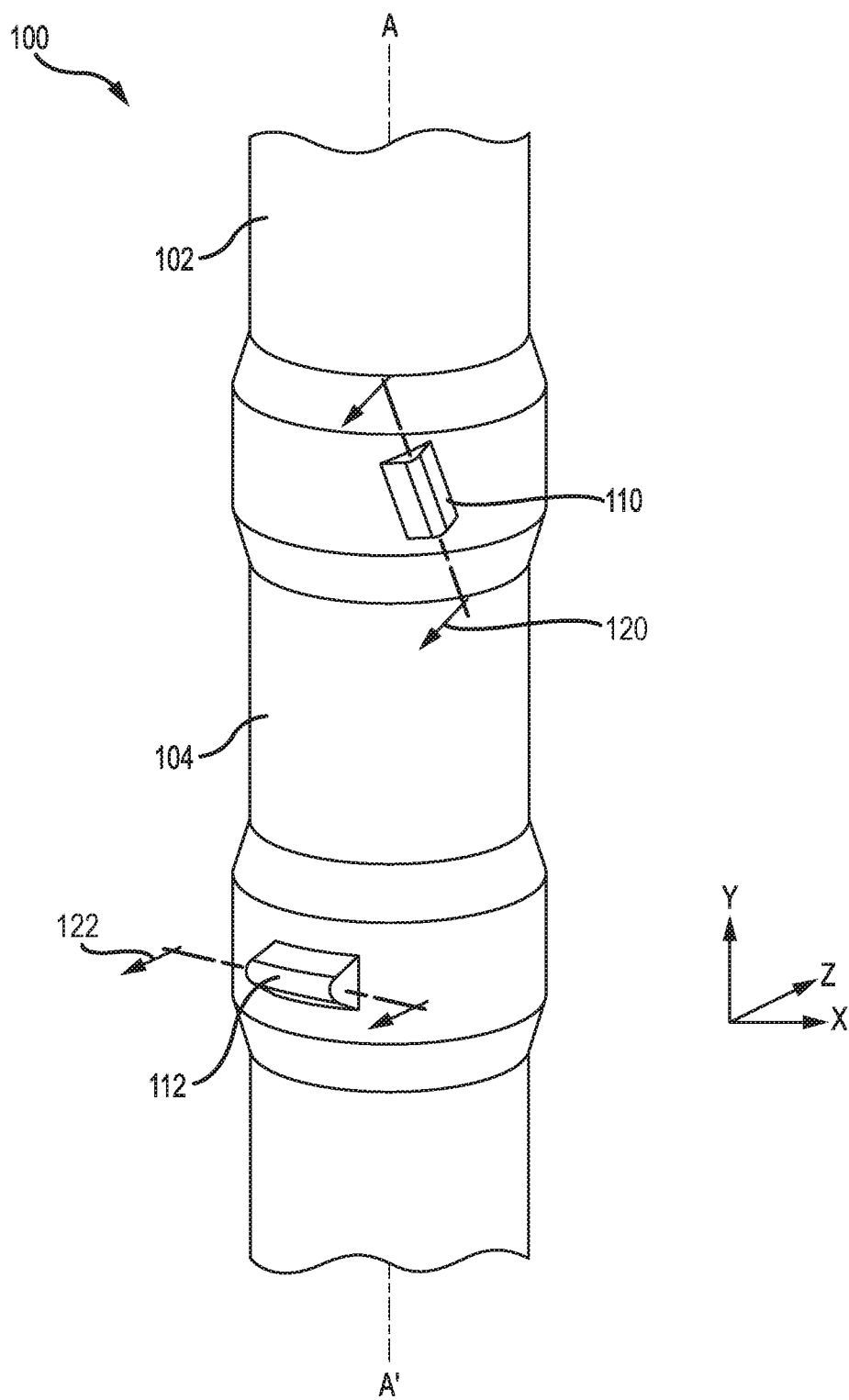
FIG. 1 illustrates a landing gear arrangement, in accordance with various embodiments.

With reference to FIG. 1, a landing gear arrangement 100 is illustrated, in accordance with various embodiments. An xyz-axes is provided for ease of illustration. Landing gear arrangement 100 may include a landing gear component 102. In various embodiments, landing gear component 102 may comprise a shock strut 104. However, landing gear component 102 may comprise any suitable landing gear component. Landing gear component 102 may comprise a centerline axis A-A'. Centerline axis A-A' may extend generally in the y-direction. Landing gear arrangement 100 may include a number of joints, such as first joint 110 and second joint 112 for example. First joint 110 may experience a first load 120. First load 120 may be non-parallel to axis A-A'. In various embodiments, first load 120 may comprise a single force or several forces, which may generate a combination of forces and/or moments on first joint 110. Second joint 112 may experience a second load 122. Second load 122 may be non-parallel to axis A-A'. For example, second load 122 may be perpendicular to axis A-A'. In various embodiments, second load 122 may be oriented at an angle of between 0° and 90° with respect to axis A-A'. In various embodiments, second load 122 may be oriented at an angle of between 0° and 90° with respect to the radial direction. In various embodiments, second load 122 may be similar to first load 120. In this manner, a load may be transferred between landing gear component 102 and an adjacent component via first joint 110 or second joint 112.

Figure 2:
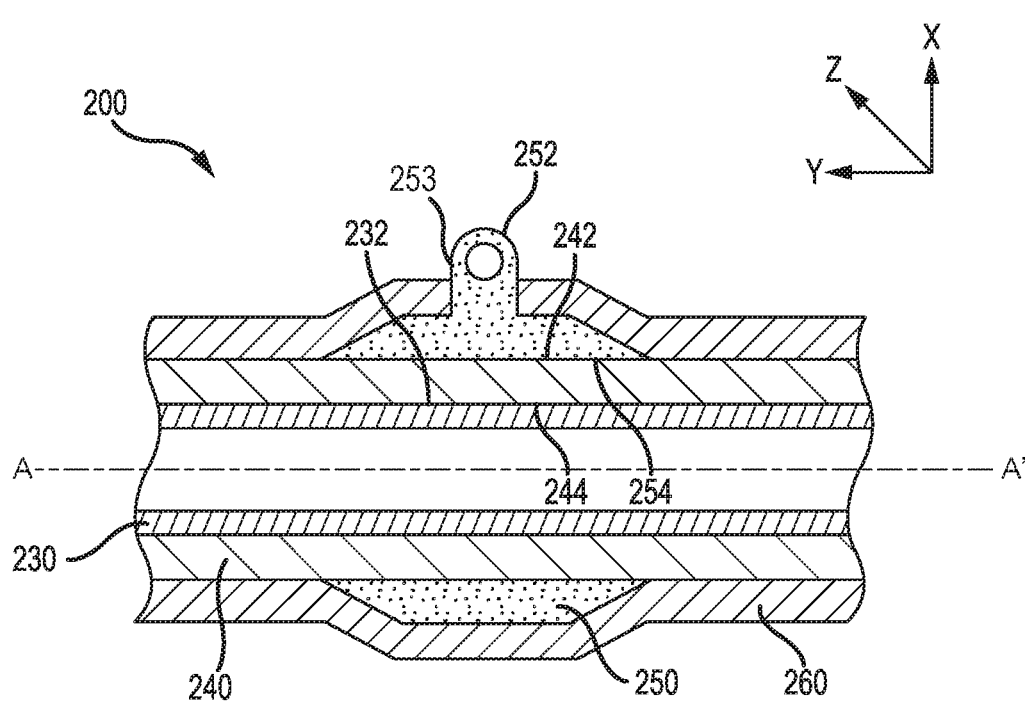
FIG. 2 illustrates an axial cross-section view of a landing gear arrangement, in accordance with various embodiments.

With reference to FIG. 2, a cross-section view of a landing gear arrangement 200 is illustrated, in accordance with various embodiments. An xyz-axes is provided for ease of illustration, the y-axis being parallel with centerline axis A-A'. Landing gear arrangement 200 may include a metallic liner (also referred to herein as a cylindrical member) 230, a first composite layer 240, a load transfer member (also referred to herein as a metallic load transfer member) 250, and/or a second composite layer 260. Metallic liner 230 may comprise a metallic tube or cylinder. In various embodiments, metallic liner 230 may function as a fluid barrier and/or wear protection for first composite layer 240. For example, landing gear arrangement 200 may comprise a landing gear shock strut. Thus, a piston and a fluid may be located radially inward of metallic liner 230. In various embodiments, first composite layer 240, load transfer member 250, and second composite layer 260 may share a common centerline axis A-A'. In various embodiments, metallic liner 230, first composite layer 240, load transfer member 250, and second composite layer 260 may comprise a circular, ellipsoidal, trapezoidal, square, rectangular, or any other suitable geometry, as viewed from an axial direction.

In various embodiments, first composite layer 240 and second composite layer 260 may comprise landing gear component 102 (see FIG. 1). First composite layer 240 and second composite layer 260 may comprise, for example, a lightweight polymer matrix composite such as a carbon fiber composite material or a hydrocarbon fiber composite material, or a glass fiber composite material, or an organic fiber (e.g., Kevlar) composite material, or mixtures thereof. Although composite materials provide reduced weight over traditional metal components, it may be difficult to couple composite materials to metal components. First composite layer 240 and second composite layer 260 may be collectively referred to herein as a cylindrical composite member.

First composite layer 240 may be situated radially inward from second composite layer 260. Load transfer member 250 may be located between first composite layer 240 and second composite layer 260. Metallic liner 230 may comprise an outer surface 232. In various embodiments, first composite layer 240 may comprise a cylindrical geometry. First composite layer 240 may comprise an outer surface 242 and an inner surface 244. A diameter of outer surface 232 of metallic liner 230 may be substantially equal to a diameter of inner surface 244 of first composite layer 240. Load transfer member 250 may comprise an inner surface 254. A diameter of outer surface 242 of first composite layer 240 may be substantially equal to a diameter of inner surface 254 of load transfer member 250. Inner surface 254 may be in contact with first composite layer 240. In various embodiments, load transfer member 250 may comprise a tab (also referred to herein as a connecting tab or metallic connecting tab) 252 extending radially outward from load transfer member 250. In various embodiments, tab 252 may comprise a lug 253. Tab 252 may extend through second composite layer 260. Thus, second composite layer 260 may comprise a "cut-out" through which tab 252 may extend. At least a portion of tab 252 may be located further radially outward than second composite layer 260, as illustrated.

In various embodiments, first composite layer 240 and/or second composite layer 260 may comprise one or more layers. Stated another way, one or more sheets of composite fabric may be placed over each other until a desired thickness of the layer is achieved.

With reference to FIG. 3A, FIG. 3B, and FIG. 3C, various embodiments of the second composite layer are illustrated, in accordance with various embodiments. An xy-axes is provided for ease of illustration. Such embodiments may be tailored according to various load demands.

In various embodiments, landing gear arrangement 301 may include first composite layer 341, load transfer member 351, and second composite layer 361. Landing gear arrangement 301 may include centerline axis A-A'. First composite layer 341 may be similar to first composite layer 240 (see FIG. 2). First composite layer 341 may comprise a first terminus 310 and a second terminus 311. Load transfer member 351 may be similar to load transfer member 250 (see FIG. 2). In various embodiments, second composite layer 361 may be similar to second composite layer 260 (see FIG. 2). Unlike landing gear arrangement 200 (see FIG. 2), landing gear arrangement 301 is illustrated with the metal liner (i.e., metal liner 230) (see FIG. 2) removed from within first composite layer 341. Second composite layer 361 may comprise a uniform thickness. Stated another way, a thickness $T_1$ of second composite layer 361 may be constant along the span of centerline axis A-A'. Second composite layer 361 may extend from first terminus 310 to second terminus 311.

In various embodiments, landing gear arrangement 302 may include first composite layer 342, load transfer member 352, and second composite layer 362. Landing gear arrangement 302 may include centerline axis A-A'. First composite layer 342 may be similar to first composite layer 240 (see FIG. 2). First composite layer 342 may comprise a first terminus 312 and a second terminus 313. Load transfer member 352 may be similar to load transfer member 250 (see FIG. 2). In various embodiments, second composite layer 362 may be similar to second composite layer 260 (see FIG. 2). Unlike landing gear arrangement 200 (see FIG. 2), landing gear arrangement 302 is illustrated with the metal liner (i.e., metal liner 230) (see FIG. 2) removed from within first composite layer 342. Second composite layer 362 may comprise a varying, non-uniform, or tapered thickness. Stated another way, a thickness $T_2$ of second composite layer 362 may vary along the span of centerline axis A-A'. Second composite layer 362 may axially extend from a location between load transfer member 352 and first terminus 312 to a location between load transfer member 352 and second terminus 313.

In various embodiments, landing gear arrangement 303 may include first composite layer 343, load transfer member 353, and second composite layer 363. Landing gear arrangement 303 may include centerline axis A-A'. First composite layer 343 may be similar to first composite layer 240 (see FIG. 2). First composite layer 343 may comprise a first terminus 314 and a second terminus 315. Load transfer member 353 may be similar to load transfer member 250 (see FIG. 2). In various embodiments, second composite layer 363 may be similar to second composite layer 260 (see FIG. 2). Unlike landing gear arrangement 200 (see FIG. 2), landing gear arrangement 303 is illustrated with the metal liner (i.e., metal liner 230) (see FIG. 2) removed from within first composite layer 343. Second composite layer 363 may comprise a varying, non-uniform, or tapered thickness. Stated another way, a thickness $T_3$ of second composite layer 363 may vary along the span of centerline axis A-A'. Second composite layer 363 may extend from first terminus 310 to second terminus 312.

Figure 4A:
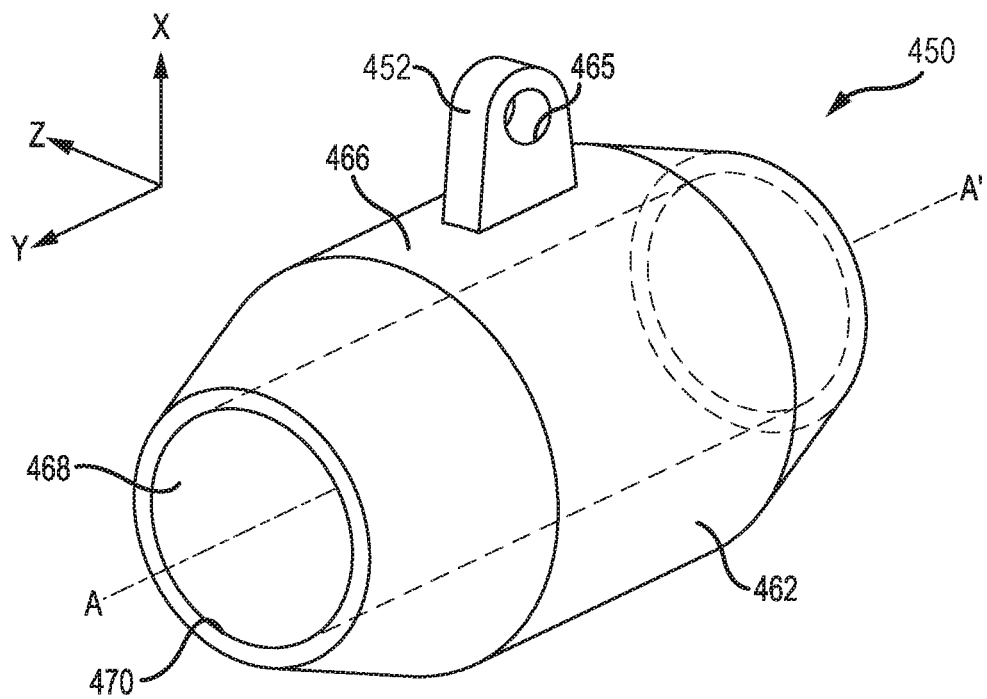
FIG. 4A illustrates a perspective view of load transfer member, in accordance with various embodiments.
Figure 4B:
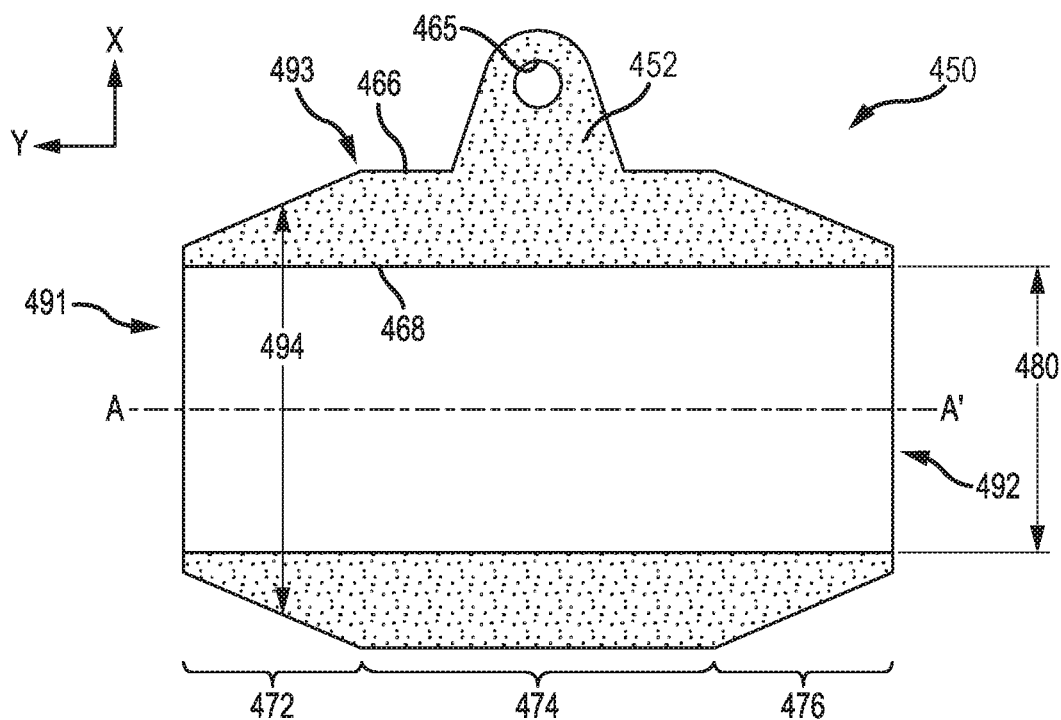
FIG. 4B illustrates an axial cross-section view of load transfer member, in accordance with various embodiments.

With respect to FIGS. 4A and 4B, elements with like element numbering as depicted in FIG. 2 are intended to be the same and will not necessarily be repeated for the sake of clarity.

With reference to FIG. 4A and FIG. 4B, a perspective view and a cross-section view of load transfer member 450 are illustrated, respectively. An xyz-axes and an xy-axes are provided, respectively, for ease of illustration. Load transfer member 450 may be similar to load transfer member 250 (see FIG. 2). In various embodiments, load transfer member 450 may comprise a ring (also referred to herein as a metallic ring) 462. In various embodiments, tab 452 may extend from ring 462. Tab 452 may be similar to tab 252 (see FIG. 2). Tab 452 may extend from outer surface 466 of load transfer member 450. Aperture 465 may be disposed in tab 452. A fastener or other suitable connecting device may be located within aperture 465 to connect an adjacent component to load transfer member 450. FIG. 4A illustrates aperture 465 extending perpendicular to centerline axis A-A'. Stated another way, FIG. 4A illustrates aperture 465 extending in the z-direction and illustrates centerline axis A-A' extending in the y-direction. However, in various embodiments, aperture 465 may extend in any direction relative to centerline axis A-A'. For example, aperture 465 may extend along the y-direction and thus be normal to centerline axis A-A'. In various embodiments, aperture 465 may extend at an angle of between 0° and 90° relative to centerline axis A-A'. In various embodiments, tab 452 may extend at an angle between 0° and 90° relative to the x-axis in the xz-plane. Furthermore, tab 452 may extend at an angle between 0° and 90° relative to the x-axis in the xy-plane, in accordance with various embodiments. In this regard, tab may extend from ring 462 in the radial direction, the tangential direction, and/or the axial direction, or any combination thereof. The orientation of tab 452 relative to ring 462 may be for accommodating various loads. In various embodiments, tab 452 and ring 462 may comprise a single unitary member. In various embodiments, tab 452 may be welded, brazed, or soldered to ring 462. In various embodiments, load transfer member 450 may be manufactured using additive manufacturing methods. In various embodiments, load transfer member 450 may be manufactured using subtractive manufacturing methods.

Load transfer member 450 may comprise an inner surface 468. Inner surface 468 may define aperture 470. Inner surface 468 may be a constant diameter surface. Stated another way, the diameter 480 of inner surface 468 may be constant along axis A-A'.

Load transfer member 450 may comprise an outer surface 466. Outer surface 466 may comprise a third portion (also referred to herein as a constant diameter portion) 474, a first portion (also referred to herein as a varying diameter portion) 472, and a second portion (also referred to herein as a second varying diameter portion) 476. First portion 472 and second portion 476 may be located at opposite ends of third portion 474. Stated another way, first portion 472 may be located at first terminus 491 and a second portion 476 may be located at second terminus 492, with third portion 474 located axially between first portion 472, and second portion 476. Tab 452 may extend from third portion 474. Although illustrated as having only one tab 452, load transfer member 450 may comprise a plurality of tabs, in accordance with various embodiments.

In various embodiments, a minimum diameter of the first portion 472 is located at first terminus 491 of ring 462 and a maximum diameter of first portion 472 may be located at a junction 493 between third portion 474 and first portion 472. The diameter 494 of first portion 472 may comprise a monotonically decreasing diameter from junction 493 to first terminus 491. In various embodiments, said monotonically decreasing diameter may decrease linearly. In various embodiments, said monotonically decreasing diameter may decrease non-linearly. In this regard, first varying diameter portion 472 may be rounded. In various embodiments, second varying diameter portion 476 may be similar to first varying diameter portion 472.

In various embodiments, third portion 474 of outer surface 466 may comprise a constant diameter. In various embodiments, third portion 474 of outer surface 466 may comprise a rounded, ellipsoidal, tapered, or any other suitable geometry. Similarly, first portion 472 and second portion 476 may comprise any suitable geometry. For example, outer surface 466 may comprise an arc or rounded surface. In various embodiments, first portion 472, third portion 474, and second portion 476 may be seamlessly integrated. In various embodiments, junction 493 may comprise a chamfer or rounded edge.

In various embodiments, metallic components, as provided herein, may include load transfer member 250 and/or metallic liner 230 (see FIG. 2). Such metallic components may comprise steel, stainless steel, titanium, aluminum, a cobalt-containing alloy, alloys of the aforementioned, or any other suitable metal or metal alloy.

In various embodiments, polymer composite components, as provided herein, may include first composite layer 240 and/or second composite layer 260, with reference to FIG. 2. Said composite components may comprise carbon fibers, glass fibers, hydrocarbon fibers, organic fibers (e.g., Kevlar), or any other suitable fibers, in a polymer matrix. Said polymer matrix of aforementioned polymer matrix composite components may comprise thermosetting polymer resin or resins, such as epoxy, polyimide, bismaleimide, phenolic, or any other suitable polymer or blend of polymers. Said polymer of aforementioned polymer matrix composite components may also comprise thermoplastic polymer or polymers, such as polyetherimide (PEI), polyetheretherketone (PEEK), polyphenylene sulfide (PPS), polyetherketoneketone (PEKK) or any other suitable polymer or blend of polymers.

Figure 5:
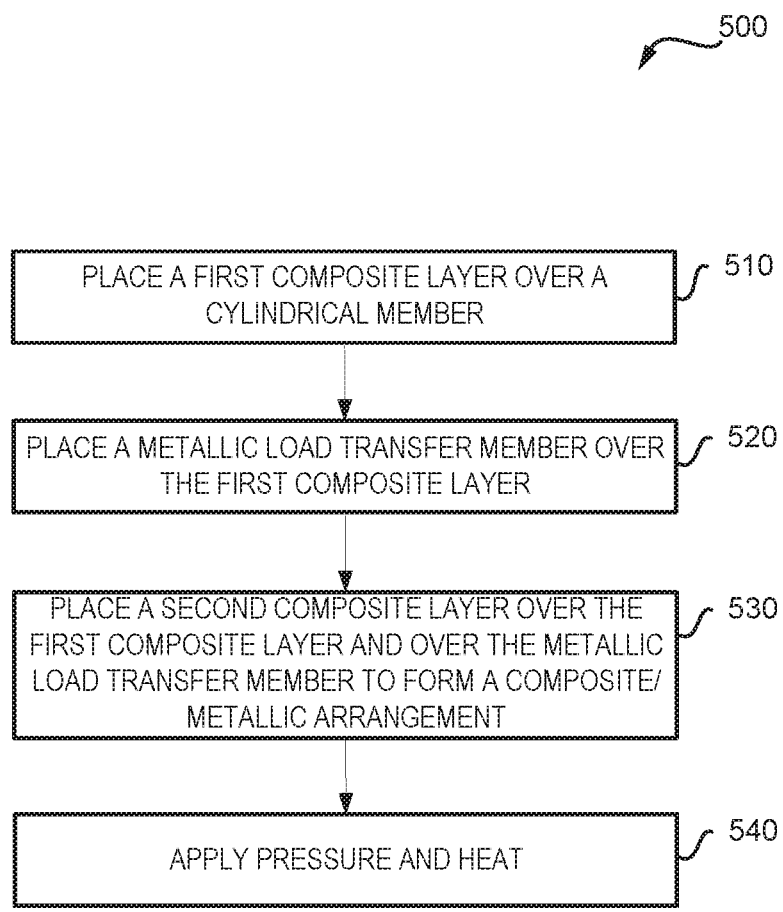
FIG. 5 provides a method for connecting a metallic member to a composite cylinder, in accordance with various embodiments.

With reference to FIG. 5, a method 500 for connecting a metallic member (i.e., load transfer member 250), with momentary reference to FIG. 2, to a composite cylinder (i.e., first composite layer 240 and/or second composite layer 260) is provided. Method 500 may include placing a first composite layer over a cylindrical member, in step 510. Method 500 may include placing a metallic load transfer member over the first composite layer, in step 520. Method 500 may include placing a second composite layer over the first composite layer and over the metallic load transfer member to form a composite/metallic arrangement, in step 530. Method 500 may include applying heat and pressure, in step 540.

In various embodiments, with additional reference to FIG. 2, metallic liner 230 may function as an integrated mandrel for shaping and/or forming first composite layer 240. Step 510 may include winding, wrapping, or otherwise placing first composite layer 240 over metallic liner (also referred to herein as a cylindrical member) 230 using filament winding or wrapping techniques or both. Step 520 may include placing load transfer member 250 over first composite layer 240 to a desired location. In this regard, load transfer member 250 may perimetrically surround a portion of first composite layer 240, in accordance with various embodiments. In various embodiments, load transfer member 250 may circumferentially surround a portion of first composite layer 240. Step 530 may include winding, wrapping, or otherwise placing second composite layer 260 over first composite layer 240 and at least a portion of load transfer member 250. In this regard, second composite layer 260 may perimetrically surround at least a portion of load transfer member 250. Similarly, second composite layer 260 may perimetrically surround at least a portion of first composite layer 240. Step 540 may include curing the composite landing gear arrangement (also referred to herein as a composite/metallic arrangement) 200 in an autoclave, or otherwise applying heat and pressure, to cure and crosslink a polymer resin located in or on first composite layer 240 and second composite layer 260. The application of pressure may include applying vacuum. Such resin may comprise an epoxy, polyimide, melamine, or any other suitable polymer resin. Thus, in various embodiments, first composite layer 240 and second composite layer 260 may be impregnated with said resin. In this regard, landing gear arrangement 200 may comprise a single unitary member after said resin has been cured.

Figure 6:
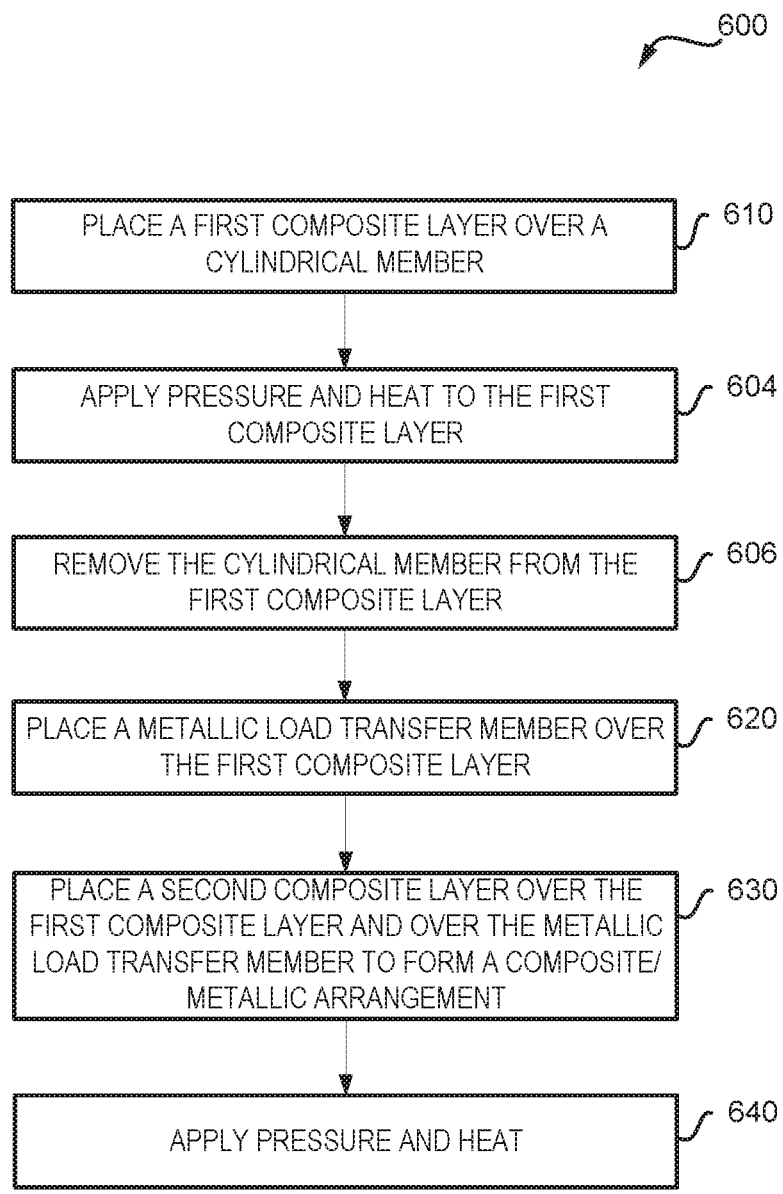
FIG. 6 provides a method for connecting a metallic member to a composite cylinder, in accordance with various embodiments.

With reference to FIG. 6, a method 600 for connecting a metallic member (i.e., load transfer member 250), with momentary reference to FIG. 2, to a composite cylinder (i.e., first composite layer 240 and/or second composite layer 260) is provided. Method 600 may include placing a first composite layer over a cylindrical member, in step 610. Method 600 may include applying pressure and heat to the first composite layer, in step 604. Method 600 may include optionally removing the cylindrical member from the first composite layer, in step 606. Method 600 may include placing a metallic load transfer member over the first composite layer, in step 620. Method 600 may include placing a second composite layer over the first composite layer and over the metallic load transfer member to form a composite/metallic arrangement, in step 630. Method 600 may include applying heat and pressure, in step 640.

In various embodiments, with additional reference to FIG. 2, first composite layer 240 may be cured after being placed over metallic liner 230. Then, load transfer member 250 may be placed over first composite layer 240 and second composite layer 260 may be placed over first composite layer 240 and load transfer member 250. In this regard, step 610 may be similar to step 510 (see FIG. 5). Step 604 may include curing first composite layer 240, along with metallic liner 230, in an autoclave, or otherwise applying heat and pressure, to cure a resin located in or on first composite layer 240. As previously mentioned, the application of pressure may include applying vacuum to landing gear arrangement 200. Step 606 may include optionally removing metallic liner 230 from first composite layer 240 after first composite layer 240 has been cured. Step 620 may be similar to step 520 (see FIG. 5). Step 630 may be similar to step 530 (see FIG. 5). Step 640 may be similar to step 540 (see FIG. 5). Method 600 may be particularly useful when using metallic liner 230 as a removable mandrel. In this manner, metallic liner 230 may be optionally removed after curing first composite layer 240. Stated another way, metallic liner 230 may comprise a removable mandrel. Thus, metallic liner 230 may be removed from landing gear arrangement 200 after the curing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear arrangement comprising:
a first composite layer, the first composite layer having a cylindrical geometry;
a metallic ring comprising an inner surface and an outer surface, the metallic ring perimetrically surrounding at least a portion of the first composite layer, the inner surface being in contact with the first composite layer;
a metallic connecting tab extending away from the outer surface; and
a second composite layer at least partially perimetrically surrounding the metallic ring and the first composite layer, the outer surface being in contact with the second composite layer,
wherein the connecting tab extends through the second composite layer.

2. The landing gear arrangement of claim 1, wherein the outer surface comprises:
a constant diameter portion;
a first varying diameter portion; and
a second varying diameter portion, the first varying diameter portion and the second varying diameter portion being located at axially opposite ends of the constant diameter portion, the metallic connecting tab extending from the constant diameter portion.

3. The landing gear arrangement of claim 2, wherein a minimum diameter of the first varying diameter portion is located at a first terminus of the metallic ring and a maximum diameter of the first varying diameter portion is located at a junction of the constant diameter portion and the first varying diameter portion.

4. The landing gear arrangement of claim 3, wherein the first varying diameter portion comprises a monotonically decreasing diameter from the junction of the constant diameter portion and the first varying diameter portion to the first terminus.

5. The landing gear arrangement of claim 1, wherein the second composite layer comprises a uniform thickness.

6. The landing gear arrangement of claim 1, wherein the second composite layer comprises a monotonically decreasing thickness, the monotonically decreasing thickness decreasing axially along the second composite layer.

7. The landing gear arrangement of claim 6, wherein the second composite layer extends axially from a location between the metallic ring and a first terminus of the second composite layer to a location between the metallic ring and a second terminus of the second composite layer.

8. A landing gear arrangement comprising:
a first composite layer having an outer surface;
a metallic load transfer member comprising an inner surface having a constant diameter and an outer surface, the metallic load transfer member perimetrically surrounding at least a portion of the first composite layer, wherein the constant diameter and a diameter of the outer surface are substantially equal;
a metallic connecting tab extending away from the outer surface; and
a second composite layer perimetrically surrounding at least a portion of the metallic load transfer member,
wherein the connecting tab extends through the second composite layer.

9. The landing gear arrangement of claim 8, wherein the second composite layer comprises an outer layer of the landing gear arrangement.

10. The landing gear arrangement of claim 8, wherein at least one of the first composite layer or the second composite layer is impregnated with a resin.

11. The landing gear arrangement of claim 10, wherein the landing gear arrangement is cured to form a single unitary member.

12. The landing gear arrangement of claim 10, wherein the metallic load transfer member comprises the metallic connecting tab extending away from the metallic load transfer member in at least one of a radial, axial, and tangential direction, and extending through the second composite layer, wherein at least a portion of the metallic connecting tab is located further radially outward than the second composite layer.

13. The landing gear arrangement of claim 8, further comprising a metallic liner, the metallic liner comprising a cylinder.

14. The landing gear arrangement of claim 13, wherein the metallic liner is located radially inward from the first composite layer, the first composite layer being wrapped around the metallic liner.

15. The landing gear arrangement of claim 14, wherein a diameter of an inner surface of the first composite layer and a diameter of an outer surface of the metallic liner are substantially equal.

16. A method for connecting a metallic member to a composite cylinder comprising:
 placing a first composite layer over a cylindrical member, the first composite layer having an outer surface;
 placing a metallic load transfer member over the first composite layer, the metallic load transfer member comprising an inner surface having a constant diameter and an outer surface, the metallic load transfer member perimetrically surrounding at least a portion of the first composite layer, wherein the constant diameter and a diameter of the outer surface are substantially equal, a metallic connecting tab extending away from the outer surface;
 placing a second composite layer over at least a portion of the first composite layer and over at least a portion of the metallic load transfer member to form a composite/metallic arrangement, the second composite layer perimetrically surrounding at least a portion of the metallic load transfer member, wherein the connecting tab extends through the second composite layer; and
 applying at least one of a heat or a pressure to the composite/metallic arrangement.

17. The method of claim 16, further comprising:
 removing the cylindrical member from the first composite layer.

18. The method of claim 16, wherein the applying the at least one of the heat and the pressure is performed after the placing the first composite layer and before the placing the metallic load transfer member.

19. The method of claim 16, wherein the placing the second composite layer comprises placing the second composite layer such that the second composite layer is non-uniform in thickness.

20. The method of claim 16, wherein the placing the second composite layer comprises placing the second composite layer such that a portion of the metallic load transfer member is located further radially outward than the second composite layer.

* * * * *